S. E. McGEE, P. M. DYE, N. HOSMER, & H. SYMES.
ANIMAL-WEANING BIT.
No. 178,176. Patented May 30, 1876.
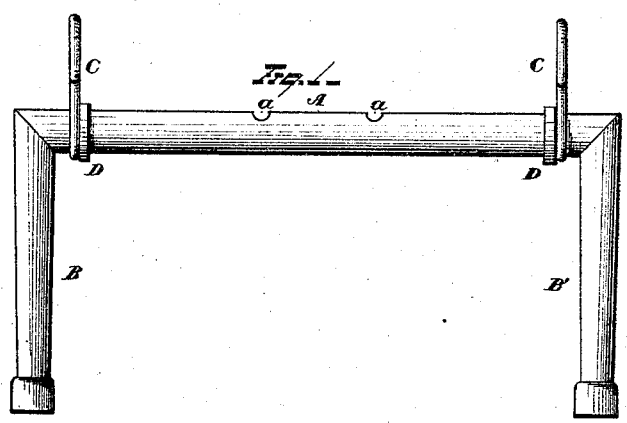
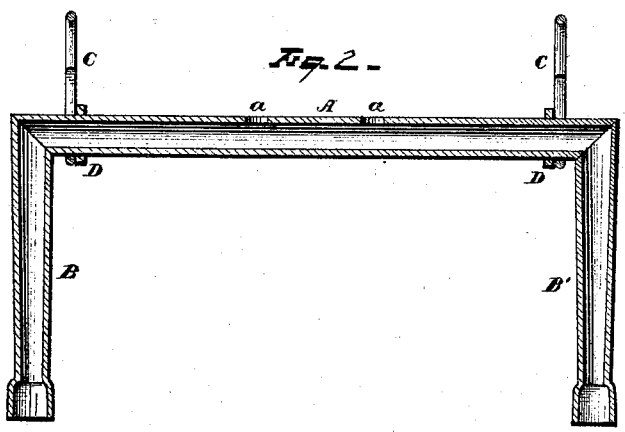

UNITED STATES PATENT OFFICE.

SOLOMON E. McGEE, PEARSON M. DYE, NELSON HOSMER, AND HORACE SYMES, OF TAMA CITY, IOWA.

IMPROVEMENT IN ANIMAL-WEANING BITS.

Specification forming part of Letters Patent No. 178,176, dated May 30, 1876; application filed April 28, 1876.

*To all whom it may concern:*

Be it known that we, S. E. McGEE, P. M. DYE, N. HOSMER, and H. SYMES, of Tama City, in the county of Tama and State of Iowa, have invented certain new and useful Improvements in Weaning-Bits; and we do hereby declare the following to be a full, clear, and exact description of the invention, such as will enable others skilled in the art to which it pertains to make and use it, reference being had to the accompanying drawings, which form part of this specification.

Our invention relates to anti-sucking bits for colts, calves, &c., to wear during their weaning-time; and has as its object allowing the animal to freely drink with this attachment on.

Heretofore it has been necessary to remove the bit from the mouth in order to permit the animal to drink without difficulty. Our improvement supplies this deficiency in the device, and allows of free and easy drafts while the animal is rigged with the full apparatus.

Our invention, hence, consists in a suction-bit having angular end tubes or projections.

In the drawings, Figure 1 is a side elevation, and Fig. 2 a central section of same view.

A is any tubular bit, having suction-holes *a* perforated in that portion which is incased by the mouth. B B' are tubes, placed at right angles to the bit A, and, respectively, at either end thereof, to which they are secured by tight joints, and so constructed that the exterior air must be drawn in through same. C are loop attachments for connecting the engaging head apparatus to the bit, and are kept in place by the collars D on same, which allow only of sufficient lateral play, as is necessary to agreeably support the bit in the mouth.

But it is apparent that these latter equipments may be changed, or omitted entirely, without affecting the nature of our invention, which latter consists, broadly, in the provision of angular end tubes to the usual suction-bit.

The operation of the foregoing is readily seen, and is as follows: The apparatus being secured to the animal's head by any appropriate means, as the animal attempts to suck or draw the milk, air will be drawn in through the end tubes, and the suction force is prevented from operating, while air is drawn in instead.

These fruitless attempts of the young animal to obtain suck will wean same, and yet they will be free to drink water as they may desire. The angular tubes drop into the water, and both a draft will be obtained therefrom, and also a direct draft without passing through said tubes, since the latter, when filled with water, will not operate adversely to further draft.

Having fully described our invention, what we claim as new, and desire to secure by Letters Patent, is—

1. A tubular suction-bit having angular tubular end projections, substantially as and for the purpose described.

2. In an anti-sucking-bit, the combination of the tubular perforated bit with the right-angled tubular end pieces, substantially as and for the purpose set forth.

3. The collars on the central tube, in combination with the angular ends for keeping the attaching mechanism clear of the mouth, substantially as and for the purpose described.

In testimony that we claim the foregoing we have hereunto set our hands this 24th day of April, 1876.

SOLOMON E. McGEE.
PEARSON M. DYE.
NELSON HOSMER.
HORACE SYMES.

Witnesses:
GEO. W. STINSON,
JOHN NICHOLSON.